s011971822B2

(12) United States Patent
Xie et al.

(10) Patent No.: US 11,971,822 B2
(45) Date of Patent: Apr. 30, 2024

(54) PROGRESSIVE CACHING OF FILTER RULES

(71) Applicant: salesforce.com, inc., San Francisco, CA (US)

(72) Inventors: Liang Xie, San Francisco, CA (US); Igor Shmulevich, San Ramon, CA (US); Ritesh Vaja, Dublin, CA (US); Zhijian Huang, San Diego, CA (US); Bowen Wang, Fremont, CA (US)

(73) Assignee: Salesforce, Inc., San Francisco, CA (US)

( * ) Notice: Subject to any disclaimer, the term of this patent is extended or adjusted under 35 U.S.C. 154(b) by 81 days.

(21) Appl. No.: 17/649,013

(22) Filed: Jan. 26, 2022

(65) Prior Publication Data

US 2023/0236978 A1 Jul. 27, 2023

(51) Int. Cl.
  G06F 9/54 (2006.01)
  G06F 12/0837 (2016.01)
  G06F 16/2453 (2019.01)

(52) U.S. Cl.
  CPC .......... *G06F 12/0837* (2013.01); *G06F 9/542* (2013.01); *G06F 16/24539* (2019.01); *G06F 2212/604* (2013.01)

(58) Field of Classification Search
  CPC ...... G06F 9/542; G06F 9/546; G06F 16/1734; H04L 47/50
  See application file for complete search history.

(56) References Cited

U.S. PATENT DOCUMENTS

| | | | |
|---|---|---|---|
| 7,849,188 B2 | 12/2010 | Yu | |
| 9,495,296 B2 | 11/2016 | Subramanyam et al. | |
| 10,938,937 B2 | 3/2021 | Tarre et al. | |
| 2003/0182464 A1 | 9/2003 | Tarre et al. | |
| 2009/0125585 A1* | 5/2009 | Krishnaswamy | ... H04M 3/4878 709/203 |
| 2010/0083278 A1 | 4/2010 | Shrgaonkar | |

\* cited by examiner

*Primary Examiner* — Andy Ho
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to filtering messages. A computer system may detect an occurrence of an event of a particular type. The computer system may determine whether to enqueue, in a message queue, a message that identifies a set of tasks to be performed in relation to the event. The determination may be based on a response received from a cache that stores a subset of filter rules of a filter rules table. Based on the response indicating a cache miss, the computer system may enqueue the message in the message queue. A process that processes the message may be operable to resolve the cache miss by 1) accessing a filter rule from the filter rules table that indicates whether messages for events of the particular type should be enqueued in the message queue and 2) updating the cache to store the filter rule.

20 Claims, 7 Drawing Sheets

PROGRESSIVE CACHING OF FILTER RULES

BACKGROUND

Technical Field

This disclosure relates generally to computer systems and, more specifically, to various mechanisms for caching rules for filtering messages.

Description of the Related Art

Enterprises routinely implement database management systems (or, simply "database systems") that enable users to store a collection of information in an organized manner that can be efficiently accessed and manipulated. During operation, a database system receives requests from users via applications or from other systems, such as another database system, to perform transactions. When performing a transaction, the database system typically reads records from a database object (e.g., a table) and writes records to a database object. In some cases, a written record can be associated with another record that is stored within the database managed by the database system.

DETAILED DESCRIPTION

Figure 1:
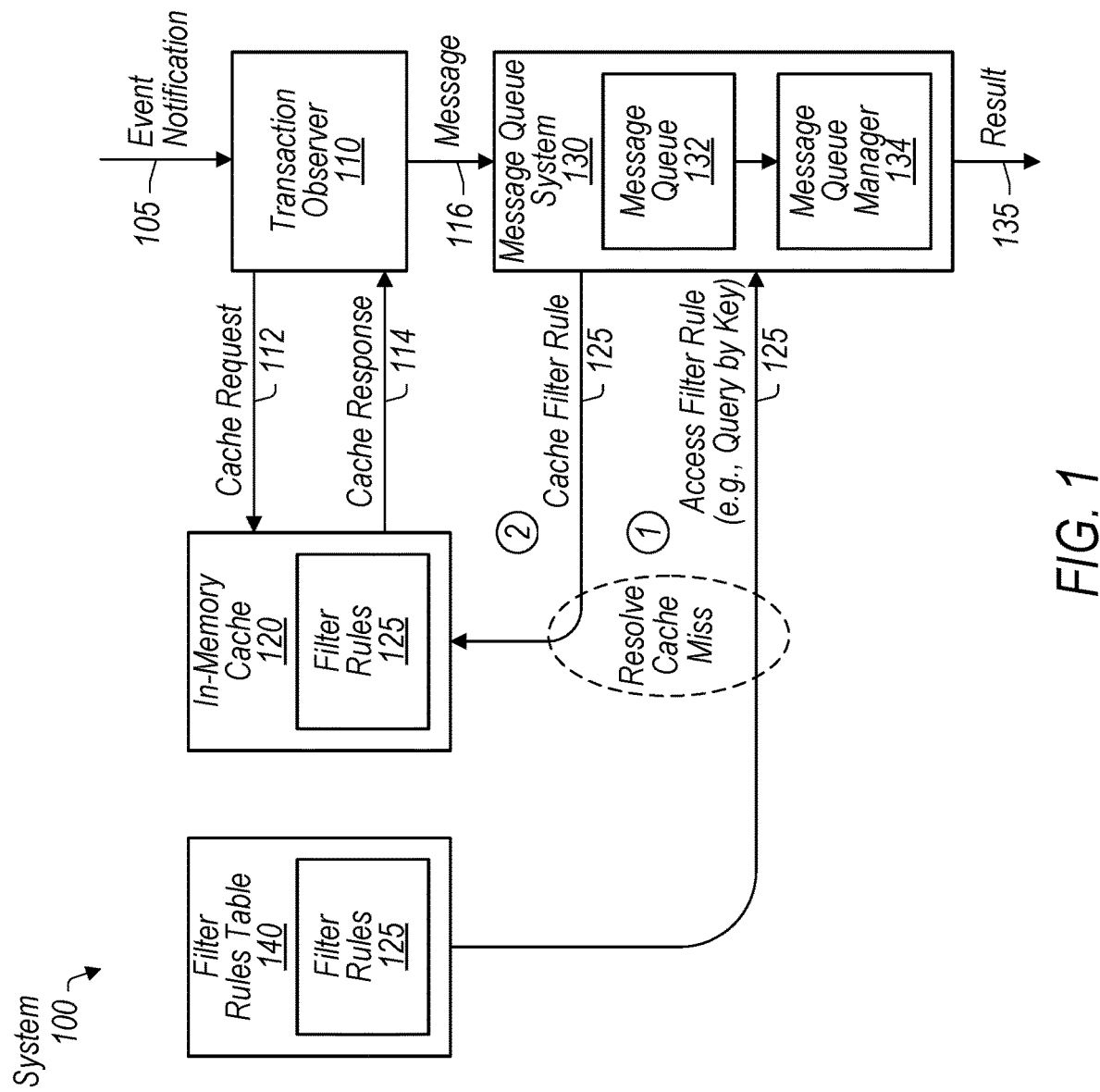
FIG. 1 is a block diagram illustrating example elements of a system having a transaction observer capable of enqueuing messages based on filter rules, according to some embodiments.

It is often desirable to create associations between records of a database. For example, it may be desirable to associate a user record describing a user with a blog record describing a blog with which the user is associated. An association can be made through the creation of an association record that associates two or more disjoint records. Particular types of records are often involved in associations and thus it may be desirable to detect events that correspond to those particular types of record. Consequently, in various embodiments, a transaction observer program is used that can detect events resulting from the execution of database transactions. For example, the transaction observer may detect the creation of an account record for which it may be desirable to create an association record. But in order to detect events, the transaction observer may be bound to a database transaction such that the database transaction turns over execution for a procedure and waits for the transaction observer to complete the procedure. By being bound to the database transaction, the transaction observer cannot carry out long-term processing to create association records without causing a time out or rollback of that database transaction. In order to combat this issue, the transaction observer may enqueue messages in a message queue to be processed afterwards by message processes that are not bound to database transactions and thus can carry out long-term processing to create association records.

But in some cases, the transaction observer may flood the message queue with too many messages that involve records that are not relevant. Consequently, in various embodiments, an in-memory cache is used to store filtering rules that can be used by the transaction observer to determine whether to enqueue a message. The time, however, that is required to resolve a cache miss so that a filter rule is made available that was not cached in the cache can be too long for the transaction observer, which is time sensitive as a result of being bound to transactions. As such, this disclosure addresses, among other things, how to handle cache misses in view of the timing constraints of the transaction observer.

In various embodiments described below, a system includes a transaction observer, an in-memory cache, a message queue, and a filter rules table. During operation, the system may execute database transactions to access, manipulate, and/or store data for a database. In various cases, the transaction observer detects the occurrence of an event associated with the execution of a database transaction. The transaction observer then determines whether to enqueue, in the message queue, a message that identifies a set of tasks (e.g., create an association record) to be performed in relation to the detected event. The transaction observer may issue a request to the in-memory cache for a response that indicates whether the message should be enqueued by the transaction observer. In some cases, the response indicates a cache miss occurred. In response, in various embodiments, the transaction observer enqueues the message in the message without knowing if the detected event is relevant. A set of message queue processes may dequeue and process the message. As part of processing that message, in various embodiments, the message queue processes resolve the cache miss by accessing a filter rule from the filter rules table that indicates whether messages of the same type of event should be enqueued in the message queue and then those message queue processes update the cache to store that accessed filter rule. In the case that the same type of event is detected, the transaction observer may receive a response from the in-memory cache that does not indicate a cache miss but rather indicates if a message should be enqueued for that event by the transaction observer.

While these techniques are discussed in the context of a system that creates association records, these techniques can be applied to other contexts in which it may be desirable to delay resolution of a cache miss. For example, a system that determines the riskiness of a transaction may use a cache to provide a quicker response to a requestor. If an indication of the riskiness of a certain type of transaction is not cached, then the system may respond with an affirmative and then later resolve the riskiness of the transaction using another component that performs a more thorough assessment of that transaction. Accordingly, these techniques can be applied to time-sensitive contexts in which a component that experiences a cache miss is unable to resolve that cache miss in view of time constraints placed on that component.

These techniques may be advantageous as they provide mechanisms for detecting and selecting specific events/work for subsequent processing. For example, these techniques allow for records to be identified so that associations can be created for those records (the subsequent work). These techniques further enable a transaction observer to become better at determining whether a message should be enqueued for a given event. That is, they allow for the progressive caching of filter rules that enable the transaction observer to control the flow of work/messages into a message queue. In particular, when the in-memory cache is initialized, it can be empty and therefore the transaction observer may enqueue a message for each transactional event that it detects. But as those messages are processed, the in-memory cache is filled with filter rules. As a result, the transaction observer becomes progressively better at filtering which messages should be enqueued according to the filter rules. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software. In the illustrated embodiment, system 100 includes a transaction observer 110, an in-memory cache 120, a message queue system 130, and a filter rules table 140. As further shown, in-memory cache 120 and filter rules table 140 store filter rules 125, and message queue system 130 includes a message queue 132 and a message queue manager 134. In some embodiments, system 100 is implemented differently than depicted. For example, system 100 may include a database system and/or there may be multiple message queues 132.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. Transaction observer 110, in-memory cache 120, and/or message queue system 130 may thus execute on and utilize the cloud resources of that cloud infrastructure (e.g., computing resources, storage resources, network resources, etc.) to facilitate their operation. As an example, transaction observer 110 may execute in a virtual environment hosted on server-based hardware that is included within a datacenter of the cloud provider. But in some embodiments, system 100 is implemented using a local or private infrastructure as opposed to a public cloud.

Transaction observer 110, in various embodiments, is software executable to detect the occurrence of events associated with database transactions and to enqueue messages for certain ones of those events. Accordingly, as illustrated, transaction observer 110 can receive an event notification 105 that identifies the occurrence of an event associated with a transaction. While not shown, that event notification 105 may be received from a database system that is executing the transaction. An example mechanism that enables transaction observer 110 to register with the database system so that it receives event notifications 105 is discussed in greater detail with respect to FIG. 2. In various embodiments, upon receiving an event notification 105, transaction observer 110 then determines whether to enqueue a message 116 in message queue 132 for the event. In order to do so, transaction observer 110 may issue a cache request 112 to in-memory cache 120 for a cache response 114 that indicates if the message should be enqueued according to a filter rule 125. Instead of the reception of an event notification 105 being a trigger event for transaction observer 110 to interact with in-memory cache 120, in various embodiments, transaction observer 110 receives a request to perform a specified operation and then interacts with in-memory cache 120 in order to facilitate that operation.

In-memory cache 120, in various embodiments, is a data structure store that is capable of storing data in the memory (e.g., random access memory) of the computer system on which in-memory cache 120 is located. Redis™ is one example of an in-memory cache 120. In some embodiments, a dedicated hardware cache is used for storing filter rules 125. In-memory cache 120 may be a key-value store that stores data as key-value pairs that each comprise a value and a corresponding key that can be used to look up that value. In various embodiments, in-memory cache 120 provides querying mechanisms that allow for queries to be executed against the data stored at in-memory cache 120. For example, in-memory cache 120 can receive a cache request 112 to look up and return a value for a specified key. Consequently, in-memory cache 120 may send a cache response 114 back to the requestor that indicates a requested value or that a cache miss occurred in which a value could not be located within in-memory cache 120 for that key. While in-memory cache 120 is depicted as storing filter rules 125, in-memory cache 120 may store other types of values or data objects. For example, in-memory cache 120 may serve as a function cache in a different context.

In various embodiments, in-memory cache 120 is located in a shared memory area that is designated by an operation system that is executing on the computer system of in-memory cache 120 and therefore may be accessible to processes of that computer system. But in some embodiments, in-memory cache 120 is distributed across multiple computer systems. In either case, in-memory cache 120 is accessible to transaction observer 110 and message queue system 130, even if transaction observer 110 and message queue system 130 are executed on the same computer system or different computer systems. An example layout of in-memory cache 120 is discussed in greater detail with respect to FIG. 3.

Message queue system 130, in various embodiments, provides a messaging mechanism that enables transaction observer 110 to enqueue work in the form of messages 116 that are to be subsequently processed by processes of message queue system 130. Message queue system 130 may thus enable an asynchronous communications protocol to be implemented in which a sender (e.g., transaction observer 110) can issue a message that a receiver of the message (e.g., message queue manager 134) does not process for a period of time. This may permit transaction observer 110 to push work from the transactional synchronous domain of transaction observer 110—referring to transaction observer 110 being synchronized with database transactions—to a transactional asynchronous domain in which that work can be performed independent of those database transactions. In various embodiments, message queue system 130 supports multiple types of operations (e.g., bulk insertion of data, bulk deletion of data, etc.) and a message queue 132 may be provisioned that stores messages representing only a particular type of operation. In some embodiments, transaction observer 110 and message queue system 130 reside within different domains and may be managed by different entities. As an example, company A may manage and provide message queue system 130 to company B for storing messages 116.

Message queue 132, in various embodiments, is a structure (e.g., a database table) that is capable of storing messages 116 that identify a set of tasks/operations to be performed. For example, transaction observer 110 may enqueue a message 116 that identifies an event and/or database object to be further analyzed in order to determine if an association record should be created. While a single message queue 132 is illustrated, there may be multiple message queues 132, each associated with processes that process messages 116 from their respective message queue 132. In some embodiments, there may be a message queue 132 for each tenant of system 100 and/or each type of event that is detectable by transaction observer 110. Consequently, if transaction observer 110 detects an event that is associated with a particular tenant, transaction observer 110 may enqueue a message 116 for that event in a message queue 132 bound to that tenant. In various embodiments, messages that are enqueued in a message queue 132 are stored there until message queue manager 134 retrieves them.

Message queue manager 134, in various embodiments, processes messages 116 that are enqueued in message queue 132. Message queue manager 134 may comprise a set of processes, each of which may be operable to dequeue a message 116 from message queue 132 and execute a message queue handler to process that message 116. Processing a message 116 may include determining whether an event involves a database object that should be associated with another database object and then outputting a result 135 (e.g., an association record) if applicable to associate the database objects (or database records). As a part of processing a message 116, in various embodiments, message queue manager 134 accesses a filter rule 125 from filter rules table 140. In some cases, a filter rule 125 is accessed only if that message 116 indicates that a cache miss occurred when transaction observer 110 issued a cache request 112 to in-memory cache 120. Message queue manager 134 may determine whether to create an association based on that accessed filter rule 125. In various embodiments, message queue manager 134 caches that filter rule 125 at in-memory cache 120 so that a cache miss may not occur for transaction observer 110 when it detects an occurrence of the same type of event. While a table is depicted, in some embodiments, rules 125 are stored in other types of database objects (e.g., a document in a NoSQL database implementation). This process is discussed in more detail with respect to FIG. 4.

Figure 2:
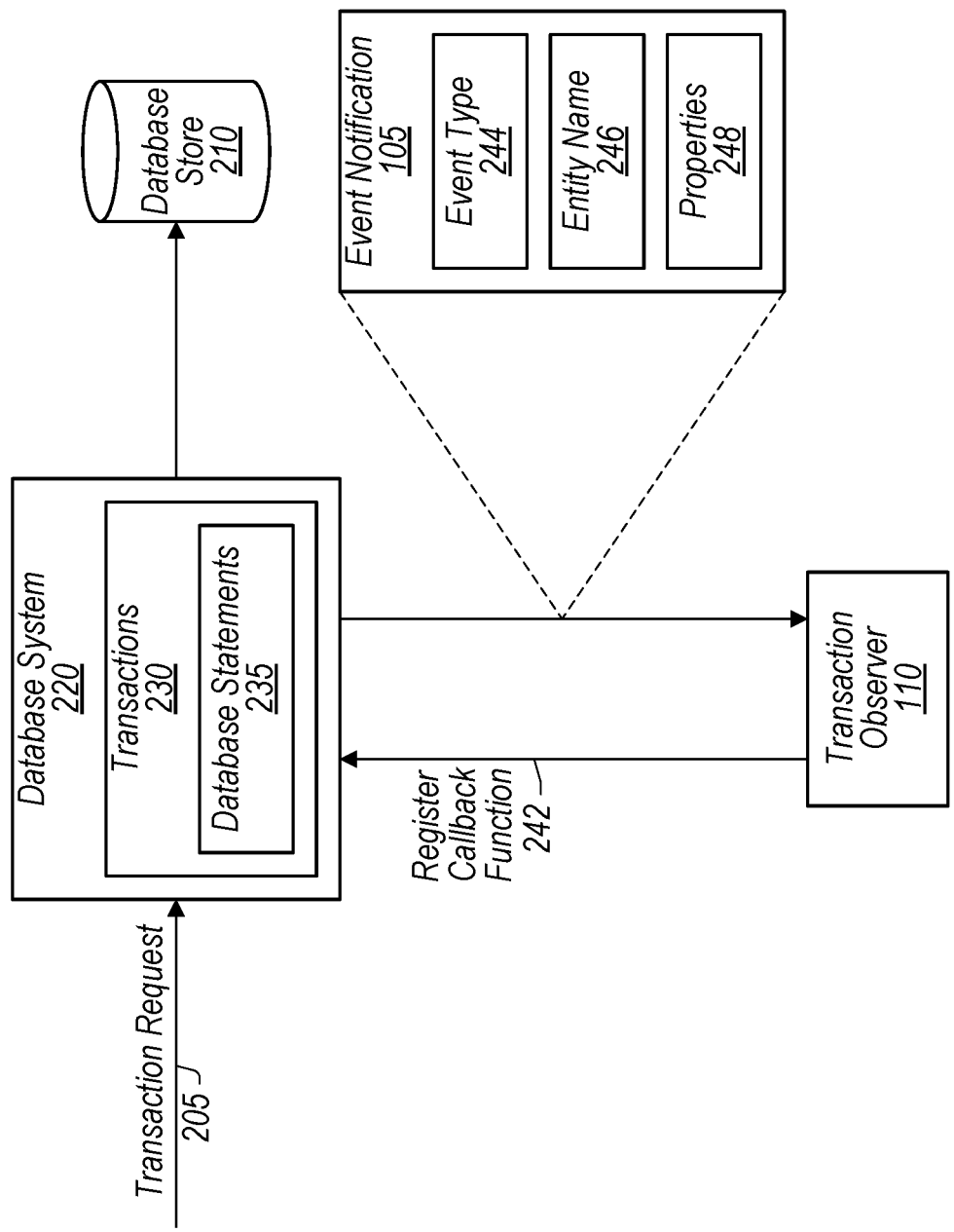
FIG. 2 is a block diagram illustrating example elements of a database system providing an event notification to the transaction observer, according to some embodiments.

Turning now to FIG. 2, a block diagram of a database system 220 that provides an event notification 105 to transaction observer 110 is shown. Within the illustrated embodiment, there is transaction observer 110, a database store 210, and database system 220. While not depicted, an application, such as a web server, may send transaction requests 205 to database system 220 to perform transactions 230. The illustrated embodiment may be implemented differently than shown. For example, database system 220 may comprise multiple database nodes that provide the database services of database system 220.

Database store 210, in various embodiments, includes a collection of information that is organized in a manner that allows for access, storage, and manipulation of that information. Database store 210 may include supporting software (e.g., storage nodes) that enable database system 220 to carry out the operations (e.g., accessing, storing, etc.) on the information that is stored at database store 210. In various embodiments, database store 210 is implemented using a single or multiple storage devices that are connected together on a network (e.g., a storage attached network (SAN)) and configured to redundantly store information in order to prevent data loss. The storage devices may store data persistently and therefore database store 210 may serve as a persistent storage for system 100. In various embodiments, data is stored at database store 210 in records structured according to one or more schemas. In some cases, system 100 may implement a relational database and thus the schemas may describe tables, views, indexes, relationships, triggers, etc. Accordingly, a record stored at database store 210 may correspond to a row in a database table and specify values for one or more fields of that table.

Database system 220, in various embodiments, provides various database services that can include data storage, data retrieval, and data manipulation. Database system 220 may be a combination of hardware and software (e.g., a database application) that is executed using that hardware. The database application is executable to provide the database services of database system 220 to components within system 100 and/or external to system 100. For example, as shown, database system 220 can receive (e.g., via an API, such as Java Database Connectivity) a transaction request 205 from a client system to perform a transaction 230. A transaction 230, in various embodiments, is a logical unit of work (e.g., a specified set of database statements 235) to be performed in relation to database store 210. For example, processing a transaction 230 might include executing a SELECT database statement 235 to select a set of rows from a set of tables. The contents of a row may be specified in a record and thus database system 220 may return records corresponding to those rows. In some cases, a transaction 230 may specify one or more database statements 235 to create new database objects or update existing database objects stored in database store 210. The creation or modification of a database object may be an event that is desirable to detect and thus transaction observer 110 may register with database system 220 to receive event notifications 105 pertaining to those events.

To register with database system 220, in some embodiments, transaction observer 110 provides a callback function 242 to database system 220, as illustrated. Callback function 242, in various embodiments, is a set of software routines that are executed within the execution of another function/routine. In particular, database system 220 may register callback function 242 with a transaction 230 such that upon reaching a certain point in the execution of the transaction 230, database system 220 invokes callback function 242 to execute those routines specified by callback function 242. In various embodiments, the execution of callback function 242 causes an event notification 105 to be sent to transaction observer 110. In some embodiments, instead of callback function 242 being used, transaction observer 110 may provide an endpoint where database system 220 sends event notifications 105 during the execution of transactions 230. In some embodiments, database system 220 stores event notifications 105 at a location accessible to transaction observer 110 who may periodically poll the location for new event notifications 105.

As depicted, an event notification 105 specifies an event type 244, an entity name 246, and one or more properties 248. Event type 244, in various embodiments, specifies the type of database operation that was executed by database system 220. Event types 244 might include, but is not limited to, create, delete, and update—these types may correspond to particular SQL statements. Entity name 246, in various embodiments, identifies the database object that was part of the detected event. For example, entity name 246 may specify an "account" object that created as a part of a "create" event type 244. Entity name 246 may specify a unique identifier of the database object or a type of the database object (e.g., an account object). Properties 248, in various embodiments, include additional information that may be pertinent to the processing of the detected event. For example, properties 248 may specify a status value of the associated database object (e.g., a "closed" status) and system 100 may determine whether to process the event based on a rule related to the status value (e.g., process if status is "open"). Accordingly, properties 248 may specify one or more of the values that are stored in a database object.

Figure 3:
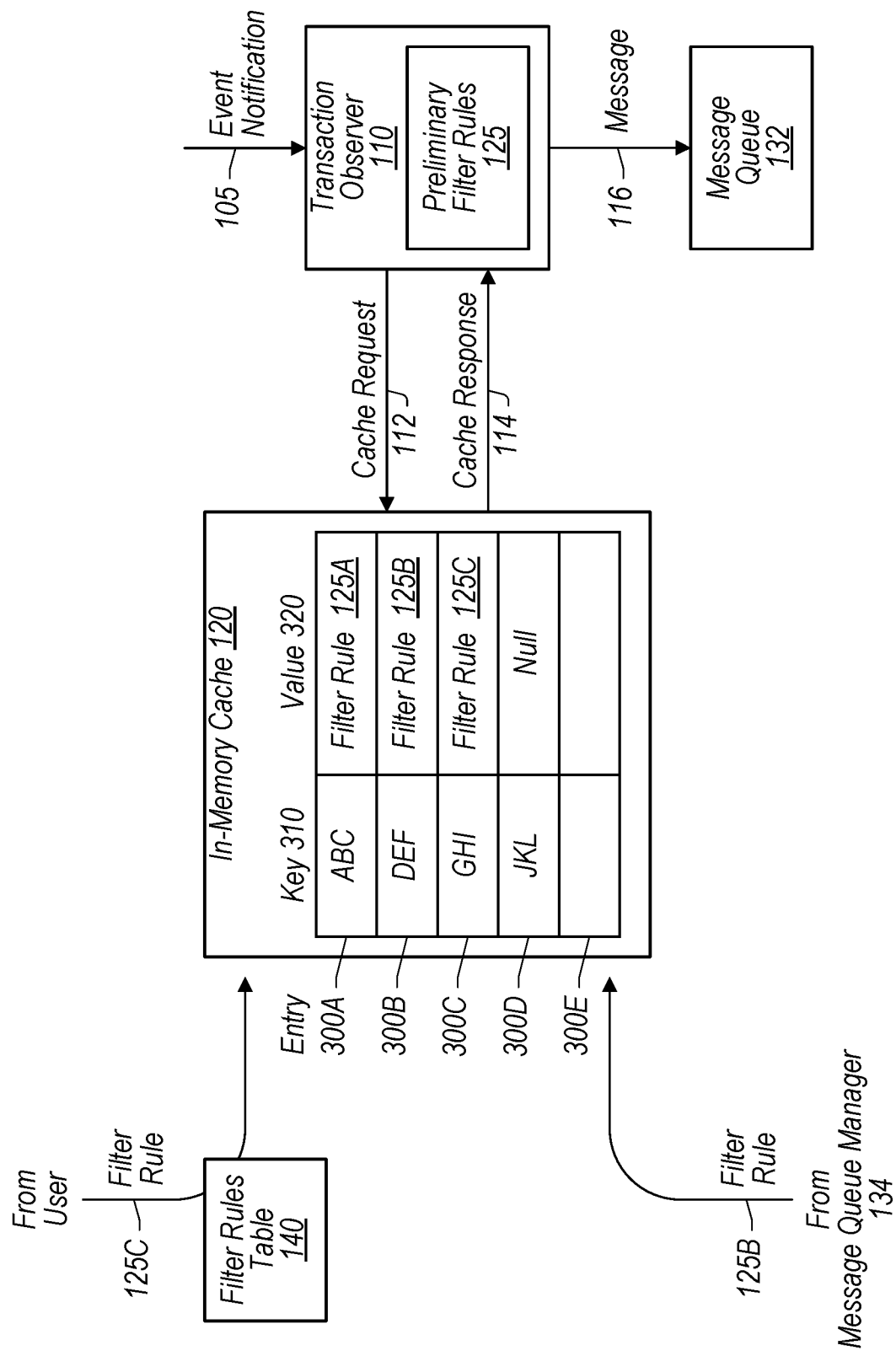
FIG. 3 is a block diagram illustrating example elements of an in-memory cache storing filter rules accessible to the transaction observer, according to some embodiments.

Turning now to FIG. 3, a block diagram of in-memory cache 120 storing filter rules 125 that are accessible to transaction observer 110 is shown. In the illustrated embodiment, there is transaction observer 110, in-memory cache 120, message queue 132, and filter rules table 140. As shown, transaction observer 110 includes preliminary filter rules 125, and in-memory cache 120 includes entries 300A-E storing values 320 accessible via corresponding keys 310. The illustrated embodiment may be implemented differently than shown. As an example, filter rules 125 might not be loaded into in-memory cache 120 in response to an update to filter rules table 140.

As explained, transaction observer 110 can receive event notifications 105 for database events and determine whether to enqueue a message 116 based on the database event. In order to determine whether to enqueue the message 116, transaction observer 110 may use filter rules 125. When in-memory cache 120 is initially spun up, in-memory cache 120 may be accessible to transaction observer 110 but may not store any filter rules 125. In various embodiments, transaction observer 110 includes a set of preliminary filter rules 125 that allows for transaction observer 110 to filter some messages 116 when in-memory cache 120 is empty or is storing a relatively small number of filter rules 125. For example, particular tenants of system 100 may want messages 116 to be enqueued for detected events. Consequently, a preliminary filter rule 125 may identify a tenant and therefore transaction observer 110 may enqueue messages 116 for events that are related to the tenant. Transaction observer 110 may thus provide preliminary filtering based on the tenant associated with a detected event. As another example, it may not be desirable to enqueue messages 116 for a particular database object and thus a preliminary filter rule 125 may cause transaction observer 110 to discard event notifications 105/messages 116 that identify the database object. In some cases, an object may not be criteria-related and thus may not have to be filtered according to a filter rule 125. Preliminary filter rules 125 may therefore identify a list of approved objects. In various embodiments, transaction observer 110 considers preliminary filter rules 125 before consulting in-memory cache 120. As illustrated, in-memory cache 120 includes entries 300 that comprise a key 310 and a corresponding value 320.

A key 310, in various embodiments, is a value that is usable to access a value 320 from in-memory cache 120. Accordingly, when transaction observer 110 issues a cache request 112, that cache request 112 may specify a key 310 to enable in-memory cache 120 to return a cache response 114 that may include the requested value 320. In various embodiments, a key 310 is derived by transaction observer 110 based on the event type 244 and the entity name 246 of an event notification 105. For example, transaction observer 110 may concatenate the event type 244 and the entity name 246 and then hash the resulting concatenation using a hash function to derive a key 310. A key 310 may also be based on a tenant identifier or properties 248 (e.g., a primary key) of an event notification 105.

A value 320, in various embodiments, is a filter rule 125 or a placeholder value (e.g., a null value) for a filter rule 125. In some cases, value 320 may take the form of a Boolean value (i.e., true or false). Accordingly, a cache response 114 may indicate true or false and transaction observer 110 may enqueue a message 116 based on that indication. In other cases, value 320 may take the form of an expression (e.g., "status=open"). Accordingly, a cache response 114 may include the expression and transaction observer 110 may determine whether to enqueue a message 116 based on whether that expression is satisfied (e.g., the properties 248 of the event notification 105 indicate an "open" status). In the case that value 320 is a null value, in-memory cache 120 may return a cache miss indicating that there is no filter rule 125 cached for the key 310 provided by transaction observer 110. In various embodiments, in response to receiving a cache miss, transaction observer 110 causes in-memory cache 120 to create an entry 300 to be filled with a filter rule 125 (e.g., by message queue manager 134). The value 320 of that entry 300 may be set to a null value.

Filter rules 125 may be loaded into in-memory cache 120 in response to the occurrence of various events. In various embodiments, transaction observer 110 enqueues a message 116 in response to receiving a cache miss and conveys to message queue manager 134 that a cache miss occurred. When message queue manager 134 processes that message 116, message queue manager 134 may retrieve a filter rule 125 from filter rules table 140 that is relevant and cache that filter rule 125 at in-memory cache 120. As depicted for example, message queue manager 134 caches, at in-memory cache 120, filter rule 125B under key 310 "DEF." Filter rule 125B may be initially accessed from filter rules table 140 by message queue manager 134 using key 310 "DEF." In some embodiments, filter rules 125 are cached in response to an update to those filter rules 125 at filter rules table 140. As depicted for example, a user may insert (or update) filter rule 125C in filter rules table 140, which may cause system 100 to cache filter rule 125C at in-memory cache 120.

As messages 116 are processed by message queue manager 134 and updates are made to filter rules table 140, in-memory cache 120 may be progressively filled with filter rules 125. But in-memory cache 120 may be of limited size and thus filter rules 125 may be evicted from in-memory cache 120. In various embodiments, after a particular amount of time has elapsed (e.g., 30 days), a portion or all of in-memory cache 120 is cleared. In some embodiments, an eviction scheme is used, such as least recently used. A filter rule 125 may also be evicted from in-memory cache 120 if that filter rule 125 is deleted from filter rules table 140.

Figure 4:
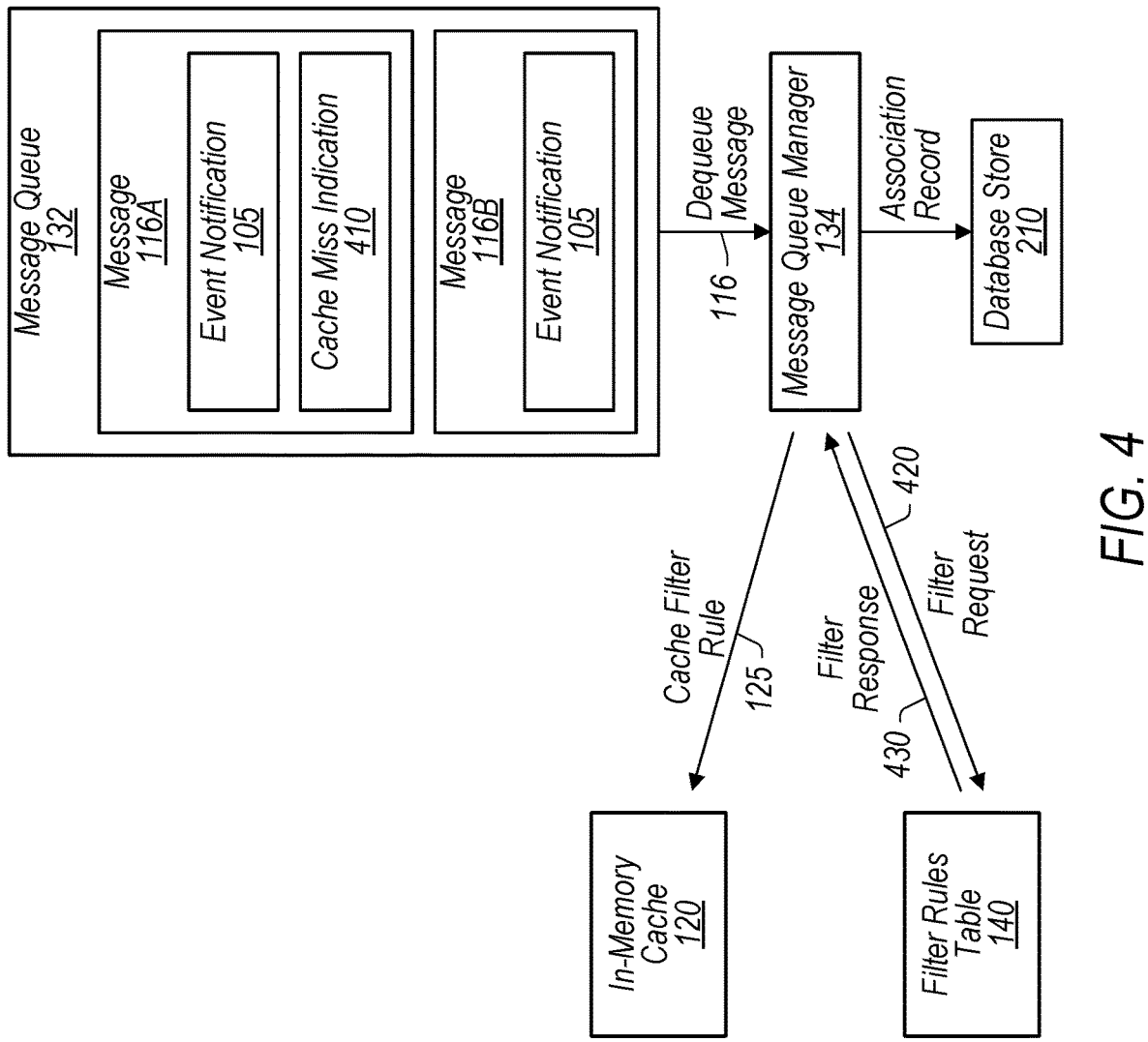
FIG. 4 is a block diagram illustrating example elements of a message queue manager processing a message enqueued by the transaction observer, according to some embodiments.

Turning now to FIG. 4, a block diagram of message queue manager 134 accessing and processing a message 116 enqueued within message queue 132. In the illustrated embodiment, there is in-memory cache 120, message queue 132 (having messages 116A-B), message queue manager 134, filter rules table 140, and database store 210. Also as shown, message 116A includes an event notification 105 and a cache miss indication 410, and message 116B includes an event notification 105. The illustrated embodiment may be implemented differently than shown. For example, message queue manager 134 may not output an association record.

In various embodiments, transaction observer 110 includes a cache miss indication 410 in a message 116 in response to receiving a cache miss response. When a process of message queue manager 134 dequeues a message 116 (e.g., message 116A) from message queue 132, the process may detect the presence of a cache miss indication 410. In response, in various embodiments, that process derives a lookup key (e.g., by hashing a concatenation of the event type 244 and the entity name 246 of the event notification 105) and issues a filter request 420 with the lookup key to filter rules table 140. The lookup key may be used to access a filter rule 125 that is returned to the process of message queue manager 134 in a filter response 430. The process may then determine whether the detected event of the dequeued message 116 satisfies the accessed filter rule 125. If that detected event satisfies that filter rule 125, then the process may generate an association record that associates a database object of the event with another database object of database store 210. The association record may then be stored in database store 210 as shown. In some embodiments, the process may implement software routines that perform other tasks than creating an association record. For example, the process may send a notification to a tenant that an event relevant to the tenant has occurred. If the detected event does not satisfy the filter rule 125, then the process may discard the accessed message 116. In either case, the process caches the accessed filter rule 125 at in-memory cache 120. As a result, the cache miss that is received by transaction observer 110 is not resolved until message queue manager 134 processes the associated message 116. That is, resolution of the cache miss may be deferred by transaction observer 110 to message queue manager 134.

When a process of message queue manager 134 dequeues a message 116 (e.g., message 116B) that does not include a cache miss indication 410, that process may process that message 116 without obtaining a filter rule 125. This may be because transaction observer 110 already determined that the event of the accessed message 116 satisfied a filter rule 125, as evident by there being no cache miss indication 410. Accordingly, the process may not store a filter rule 125 at in-memory cache 120. In some embodiments, messages 116 do not include cache miss indications 410, instead message queue manager 134 detects the presence of null values within entries 300 of in-memory cache 120 and then populates those entries 300 with filter rules 125 that correspond to the keys 310 of those entries 300. This detection and population may occur after or before dequeuing a message 116.

Figure 5:
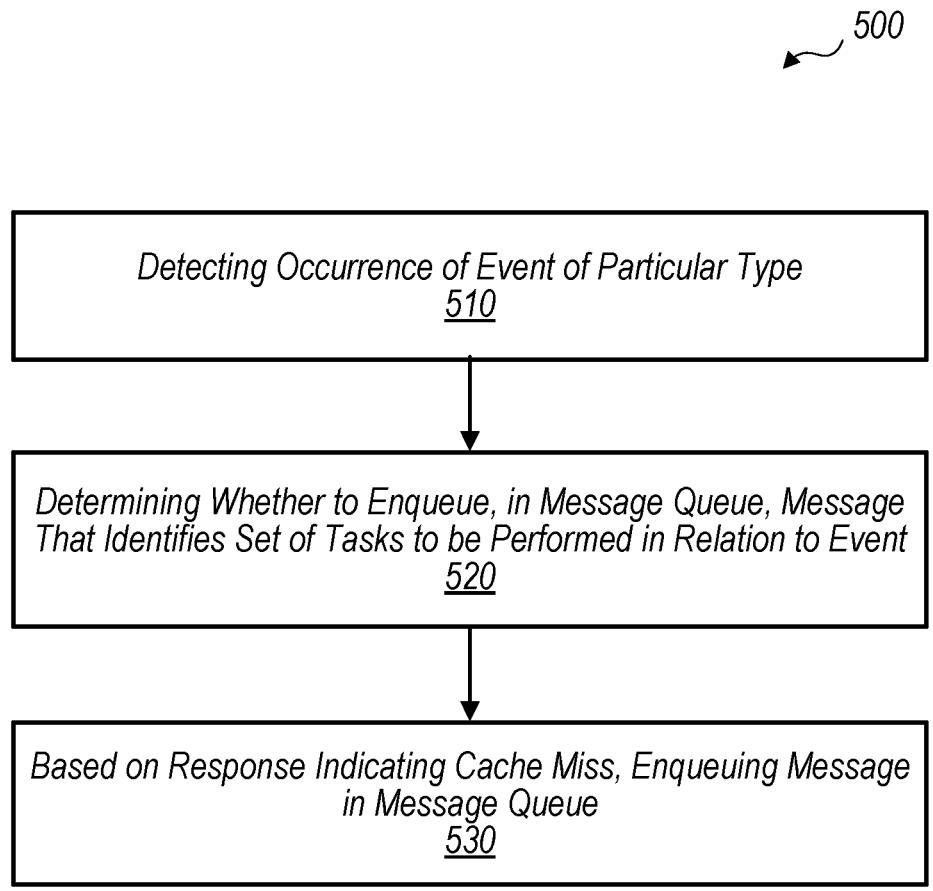
FIG. 5 is a flow diagram illustrating an example method pertaining to the transaction observer enqueuing a message, according to some embodiments.

Turning now to FIG. 5, a flow diagram of a method 500 is shown. Method 500 is one embodiment of a method that is performed by a computer system (e.g., system 100) to enqueue a message (e.g., a message 116) in response to the occurrence of an event (e.g., the execution of a database statement 235). Method 500 may be performed by executing program instructions that are stored on a non-transitory computer-readable medium. In some embodiments, method 500 includes more or less steps than depicted. For example, method 500 may include a step in which the computer system stores locally a set of preliminary rules (e.g., filter rules 125).

Method 500 begins in step 510 with the computer system detecting (e.g., receiving an event notification 105) an occurrence of an event of a particular type. In some cases, the event is associated with the execution of a database transaction (e.g., a database transaction 230) at a database system (e.g., database system 220). For example, the event may correspond to the creation of a database object by the database system.

In step 520, the computer system determines whether to enqueue, in a message queue (e.g., a message queue 132), a message that identifies a set of tasks to be performed in relation to the event. Executing those tasks might include associating the created database object with another database object. In various cases, determining whether to enqueue the message is based on a response (e.g., a cache response 114) received from a cache (e.g., an in-memory cache 120) that stores a subset of the filter rules (e.g., filter rules 125) maintained within a filter rules table (e.g., filter rules table 140). The computer system may generate a key (e.g., key 310) that is based on an event type (e.g., an event type 244) of the event and an entity identifier (e.g., an entity name 246) of an entity associated with the event. The computer system may then issue a request (e.g., a cache request 112) to the cache for a value (e.g., a value 320) corresponding to the key. Based on the response indicating a cache miss occurred, in some embodiments, the computer system creates an entry (e.g., an entry 300) in the cache. Also, based on the response indicating that the cache miss occurred, the computer system may include, within the message, a cache miss indication that the cache miss occurred In step 530, based on the response indicating that the cache miss occurred, the computer system enqueues the message in the message queue. A set of processes (e.g., message queue manager 134) that process the message is operable to resolve the cache miss by accessing a filter rule from the filter rules table that indicates whether messages for events of the particular type should be enqueued in the message queue and updating the cache to store the filter rule. Those processes may be operable to resolve the cache miss in response to detecting the cache miss indication. In some cases, the cache may be populated with the filter rule in response to an update to the filter rules table, where the update is associated with that filter rule. In various embodiments, the filter rule is stored within the cache as a Boolean value. The message may be processed after the transaction (associated with the event) has been completed.

In various cases, the computer system may detect an occurrence of another event and may determine whether to enqueue a message for the other event into the message queue. Based on receiving a response from the cache that indicates that the other event satisfies a corresponding filter rule, the computer system may enqueue a message for the other event into the message queue. Based on that response received from the cache indicating that the event does not satisfy a corresponding filter rule, the computer system may discard the message. In some cases, before issuing a request to the cache, the computer system may determine whether the event satisfies at least one of the preliminary rules. The cache may be initially empty and cleared after an elapse of a defined interval of time.

Figure 6:
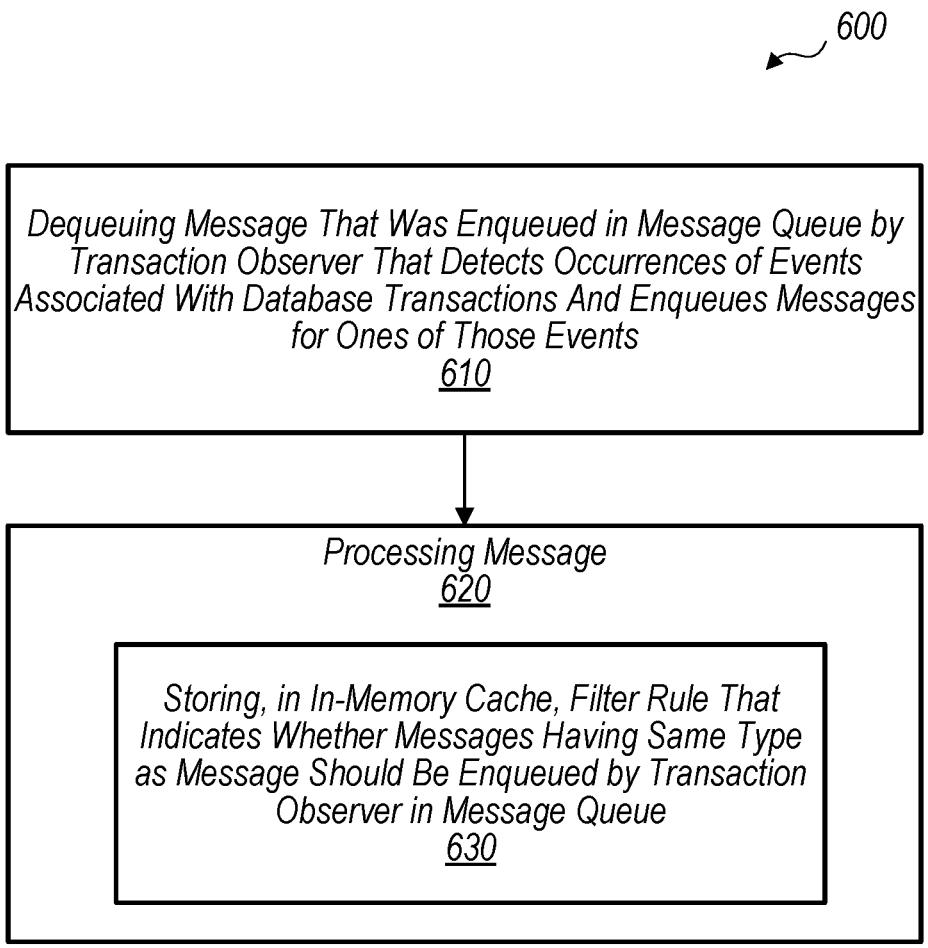
FIG. 6 is a flow diagram illustrating an example method pertaining to the message queue manager processing an enqueued message, according to some embodiments.

Turning now to FIG. 6, a flow diagram of a method 600 is shown. Method 600 is one embodiment of a method that is performed by a computer system (e.g., system 100) to process a message (e.g., a message 116) enqueued within a message queue (e.g., message queue 132). Method 600 may be performed by executing program instructions stored on a non-transitory computer-readable medium. In some embodiments, method 600 can include more or less steps than shown.

Method 600 begins in step 610 with the computer system dequeuing a message that was enqueued in a message queue by a transaction observer (e.g., transaction observer 110) that detects occurrences of events (e.g., via an event notification 105) associated with database transactions (e.g., transactions 230) and enqueues messages for ones of those events. In various embodiments, the transaction observer filters which messages are enqueued in the message queue based on a set of filter rules (e.g., filter rules 125) stored within an in-memory cache (e.g., in-memory cache 120) accessible to the transaction observer. The in-memory cache may be initially empty. In step 620, the computer system processes the message, which may indicate that a cache miss occurred for the transaction observer. As a part of processing the message, in step 630, the computer system stores, within the in-memory cache, a filter rule that indicates whether messages having a same type as the message should be enqueued by the transaction observer in the message queue.

Exemplary Computer System

Figure 7:
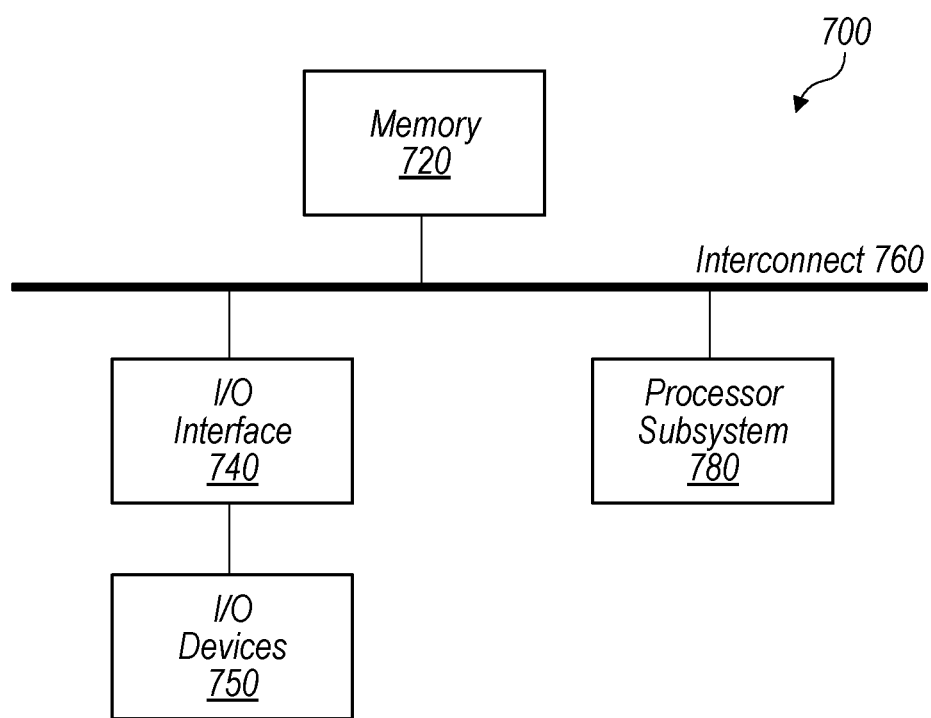
FIG. 7 is a block diagram illustrating elements of a computer system for implementing various systems described in the present disclosure, according to some embodiments.

Turning now to FIG. 7, a block diagram of an exemplary computer system 700, which may implement system 100, transaction observer 110, message queue system 130, and/or database system 220, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement transaction observer 110, message queue 132, message queue manager 134, and/or database store 210 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   detecting, by a computer system, an occurrence of an event of a particular type, wherein the event is associated with an execution of a database transaction;
   determining, by the computer system, whether to enqueue, in a message queue, a message that identifies a set of tasks to be performed in relation to the event, wherein the determining is based on a response received from a cache that stores a subset of filter rules maintained in a filter rules table; and
   based on the response indicating a cache miss, the computer system enqueuing the message in the message queue, wherein a set of processes that process the message is operable to resolve the cache miss by accessing a filter rule from the filter rules table that indicates whether messages for events of the particular type should be enqueued in the message queue and updating the cache to store the filter rule.

2. The method of claim 1, wherein determining whether to enqueue the message includes:
   generating a key based on an event type of the event and an entity identifier of an entity associated with the event; and
   issuing a request to the cache for a value corresponding to the key.

3. The method of claim 1, further comprising:
   based on the response indicating the cache miss, the computer system creating an entry in the cache, wherein the set of processes is operable to enqueue the filter rule in the entry.

4. The method of claim 1, further comprising:
   storing locally, by the computer system, a set of preliminary rules, wherein determining whether to enqueue the message includes:
      before issuing a request to the cache, determining whether the event satisfies at least one of the preliminary rules.

5. The method of claim 1, wherein the cache is populated with a given filter rule in response to an update to the filter rules table, wherein the update is associated with the given filter rule.

6. The method of claim 1, further comprising:
   detecting, by the computer system, an occurrence of another event;
   determining, by the computer system, whether to enqueue a message for the other event into the message queue; and
   based on receiving a response from the cache that indicates that the other event satisfies a corresponding filter rule, the computer system enqueuing the message for the other event into the message queue.

7. The method of claim 6, wherein the corresponding filter rule is stored within the cache as a Boolean value.

8. The method of claim 1, wherein the event corresponds to a creation of a first database object by a database system that is executing the database transaction.

9. The method of claim 8, wherein executing the set of tasks includes associating the first database object with a second database object.

10. The method of claim 1, wherein the cache is initially empty, and wherein the cache is cleared after an elapse of a defined interval of time.

11. The method of claim 1, wherein the message is processed after the database transaction has been completed.

12. A non-transitory computer readable medium having program instructions stored thereon that are executable by a computer system to cause the computer system to perform operations comprising:
   detecting an occurrence of an event of a particular type, wherein the event is associated with an execution of a database transaction;
   determining whether to enqueue, in a message queue, a message that identifies a set of tasks to be performed in relation to the event, wherein the determining is based on a response received from a cache that stores a subset of filter rules maintained in a filter rules table; and
   based on the response indicating a cache miss, enqueuing the message in the message queue, wherein a set of processes that process the message is operable to resolve the cache miss by accessing a filter rule from the filter rules table that indicates whether messages for events of the particular type should be enqueued in the message queue and updating the cache to store the filter rule.

13. The medium of claim 12, wherein the operations further comprise:
   based on the response received from the cache indicating that the event does not satisfy a corresponding filter rule, discarding the message.

14. The medium of claim 12, wherein the operations further comprise:
   based on the response indicating the cache miss, including, in the message, a cache miss indication that the cache miss occurred, wherein the set of processes is operable to resolve the cache miss in response to detecting the cache miss indication.

15. The medium of claim 12, wherein the operations further comprise:
   locally storing an approved list of events, wherein determining whether to enqueue the message includes:
      before issuing a request to the cache, determining whether the event is included in the approved list of events.

16. A system, comprising:
   at least one processor; and
   memory having program instructions stored thereon that are executable by the at least one processor to cause the system to perform operations comprising:
      receiving an event notification that identifies an occurrence of an event of a particular type, wherein the event is associated with an execution of a database transaction;
      determining whether to enqueue, in a message queue, a message that identifies a set of tasks to be performed in relation to the event, wherein the determining is based on a response received from a cache that stores a subset of filter rules maintained in a filter rules table; and
      based on the response indicating a cache miss, enqueuing the message in the message queue, wherein a set of processes that process the message is operable to resolve the cache miss by accessing a filter rule from the filter rules table that indicates whether messages for events of the particular type should be enqueued in the message queue and updating the cache to store the filter rule.

17. The system of claim 16, wherein the operations further comprise:
   locally storing a set of preliminary rules, wherein determining whether to enqueue the message includes, before issuing a request to the cache, determining whether the event satisfies at least one of the preliminary rules.

18. The system of claim 16, wherein the operations further comprise:
generating a key based on information included in the event notification; and
issuing a request to the cache for a value corresponding to the key.

19. The system of claim 16, wherein the operations further comprise:
based on the response indicating the cache miss, including, in the message, a cache miss indication that the cache miss occurred, wherein the set of processes is operable to resolve the cache miss in response to detecting the cache miss indication.

20. The system of claim 16, wherein the operations further comprise:
based on the response received from the cache indicating that the event does not satisfy a corresponding filter rule, discarding the message.

\* \* \* \* \*